United States Patent
Pourtier et al.

(10) Patent No.: US 8,055,249 B2
(45) Date of Patent: Nov. 8, 2011

(54) SYSTEM AND METHOD OF MANAGING CONNECTIONS WITH AN AVAILABLE NETWORK

(75) Inventors: René Pourtier, Mauguio (FR); Alain Basty, Prades-le-Lez (FR); Regis Nicolas, Jacou (FR); Denis Berger, Montpellier (FR); Gavin M Peacock, Walnut Creek, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

(21) Appl. No.: 11/055,491

(22) Filed: Feb. 9, 2005

(65) Prior Publication Data
US 2005/0260989 A1 Nov. 24, 2005

Related U.S. Application Data

(60) Provisional application No. 60/543,108, filed on Feb. 9, 2004, provisional application No. 60/543,356, filed on Feb. 9, 2004.

(51) Int. Cl.
*H04M 3/00* (2006.01)
*H04W 4/00* (2009.01)

(52) U.S. Cl. ............... 455/418; 455/435.3

(58) Field of Classification Search ........... 455/456.6, 455/418–420, 456.1, 432.1, 554.2, 556.2, 455/90.2, 41.1–41.2, 435.1–435.3, 550.1, 455/552.1, 553.1; 370/338, 328, 331; 709/223, 709/220, 203; 707/10, 101, 102, 104.1
See application file for complete search history.

(56) References Cited

U.S. PATENT DOCUMENTS
5,903,832 A * 5/1999 Seppanen et al. .......... 455/435.3
6,085,110 A * 7/2000 Nilsson .................... 455/552.1
(Continued)

FOREIGN PATENT DOCUMENTS
EP 0781064 A2 6/1997

OTHER PUBLICATIONS
Korean Office Action from Korean Patent Application No. 10-2006-7018447 dated Jun. 16, 2011 (with English Translation).

*Primary Examiner* — Brandon Miller
(74) *Attorney, Agent, or Firm* — Berry & Associates P.C.

(57) ABSTRACT

A system and method for automatically managing connections between a mobile device and one or more available networks (including dedicated connections), as a user changes locations, is disclosed. The connection manager determines the connection profiles and assigns an availability and priority to each available connection profile. As is well known, mobile devices have a lot of possibilities to connect to different networks and there are many protocols that dictate such connections. The connection manager feature determines the most appropriate profile to connect to an available network. In the event that an initial attempt to connect fails, the connection manager attempts a connection based on the next available profile with the highest priority, until a connection is established or there are no more available profiles. The connection manager uses algorithms for searching for a connection profile that fits criteria or search string that is specified and other parameters such as availability, priority, and usability. The system and method uses a format for connection profile representation that facilitates easy manipulation at the application level. By this format, connection profiles may be easily exchanged between remote devices. Also, the connection manager facilitates remote configuration and administering of connection profiles.

26 Claims, 3 Drawing Sheets

U.S. PATENT DOCUMENTS

| | | | |
|---|---|---|---|
| 6,748,217 B1 * | 6/2004 | Hunzinger et al. | 455/435.2 |
| 7,016,334 B2 * | 3/2006 | Cohen et al. | 370/338 |
| 7,065,367 B2 * | 6/2006 | Michaelis et al. | 455/452.2 |
| 7,096,015 B2 * | 8/2006 | Bridges et al. | 455/432.1 |
| 7,123,912 B2 * | 10/2006 | Kim et al. | 455/435.3 |
| 7,142,879 B2 * | 11/2006 | Watanabe et al. | 455/458 |
| 7,155,437 B2 * | 12/2006 | Chang et al. | 707/10 |
| 2001/0023446 A1 * | 9/2001 | Balogh | 709/229 |
| 2004/0125745 A9 * | 7/2004 | Dang et al. | 370/217 |
| 2004/0162054 A1 * | 8/2004 | Thiebot | 455/406 |
| 2005/0037754 A1 * | 2/2005 | Liu et al. | 455/435.3 |
| 2005/0037755 A1 * | 2/2005 | Hind et al. | 455/435.3 |
| 2005/0070280 A1 * | 3/2005 | Jung et al. | 455/434 |

* cited by examiner

SYSTEM AND METHOD OF MANAGING CONNECTIONS WITH AN AVAILABLE NETWORK

PRIORITY CLAIM

The present invention claims priority to U.S. Provisional Patent Application No. 60/543,108 filed on Feb. 9, 2004, and to U.S. Provisional Patent Application No. 60/543,356 filed on Feb. 9, 2004, the contents of which are incorporated herein by reference and are relied upon here.

RELATED APPLICATIONS

The present application relates to the following applications: (1) Ser. No. 11/053,613 entitled "A System And Method Of Format Negotiation In A Computing Device"; (2) PCT/US2005/003975 entitled "A Graphics Subsystem for Computing Devices"; (3) Ser. No. 10/588,879 entitled "A Method and System for a Security Model for a Computing Device," each of which are filed on the same day as the present application. The contents of each of these applications are incorporated herein by reference.

BACKGROUND OF THE INVENTION

1. Field of the Invention

The present invention relates to the field of establishing electronic communication between mobile devices (e.g. laptops, cellular telephones, and personal digital assistants (PDAs) and available communication networks (including dedicated connections) at different locations. More specifically, the present invention relates to a system and method of managing connections between a mobile device and available networks. This is accomplished by determining an appropriate connection profile at each location based on criteria such as availability, priority etc. and then establishing a connection at that location based on the profile. In the event a first attempt to establish a connection fails, the system attempts to establish a connection utilizing another profile (with the next highest priority).

2. Introduction

As the components required to build a computer system have reduced in size, portable electronic devices and computer systems (e.g. laptops, cellular telephones, and personal digital assistants (PDAs)) have gained increasing popularity. Some computers are barely "palm-sized." Most small computer systems are used to implement various Personal Information Management (PIM) applications such as an address book, a daily organizer (calendar, date book, etc.) and electronic notepads, to name a few. Many PDAs and cell phones are being integrated together resulting in a single intelligent device that provides wireless communication capability.

The ability to connect these mobile electronic devices effectively at various locations is important to justify their use in today's environment. It is not uncommon for a single user to have a portable electronic device, which may be connected to one or more other computer systems and/or servers, such as by wireless connections (Bluetooth, IrDA), local area networks (LAN, direct or wireless (WIFI-802.11 and GPRS (General Packet Radio Service) and traditional dial-up modems (e.g. PPP (Point-to-Point protocol), USB, GSM (Global System for Mobile Communication) etc.). Mobile devices have many possibilities to connect to one or more available networks and a myriad of protocols exist to facilitate the connections. With the many communication options that are available today, most devices are configured to facilitate only a particular type of connection that must be selected manually by the user. It should be understood to those skilled in the art that a reference to communication networks in this application includes point-to-point direct communication over a dedicated connection.

What is needed in the art are improved connection schemes and a mobile device configured that is configured to automatically connect it to a best available network at a particular location.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates to a system and method for automatically managing connections between a mobile device and one or more available networks as a user moves from one location to another. In accordance with one aspect of the present invention, the connection manager feature uses algorithms that rely on several connection properties, particularly priority, availability, and usability to determine an appropriate network or networks (including dedicated connections) with which to connect the mobile device. As is well known, mobile devices may use a lot of different communication technologies to connect to different networks (WiFi, Bluetooth, GPRS (General Packet Radio Service), Dialed (PPP (Point-to-Point protocol) and GSM (Global System for Mobile Communication) etc.) and there are many protocols that dictate such connections. When a user desires to connect to an appropriate network or networks, the system decides which connection profile to use, given the environment. The connection manager feature determines the most appropriate profile to connect to a communication network based on several criteria. The connection manager determines the availability of a profile by querying each "plug-in" (code responsible for establishing a physical connection) in the profile. If all the plug-ins are available, then the profile is available. Availability may change depending on system configuration and external circumstances. With respect to availability, some existing technologies may determine in real-time if there is network coverage. The plug-in associated with each technology may define the availability using such technologies. For example, a mobile phone indicates signal strength information. For the telephone-related networks, the present invention indicates the availability based on the signal strength of the network. The connection algorithm does not attempt connections that are not available. A WiFi driver determines in the background if a WiFi network is available or not. For example, a Bluetooth connection may be unavailable if there are no other Bluetooth devices within range.

With respect to usability, the user determines the usability of a profile by checking it in a list of profiles for a connection type. Only the checked profiles in the list are usable. When an automatic connection is requested, the connection manager feature considers only the usable profiles. A user may decide to disable a mobile device in the event the user decides for some reason to not use a particular profile.

Each profile also has a priority assigned to it. Profiles with a higher priority are tried first during an attempt to connect to a network. For example, LAN technologies are generally fast and economic while WAN technologies (dialed or PPP) are generally slow and expensive. Generally, LAN technologies have a higher priority than WAN technologies. In the event that an initial attempt to connect fails, the connection manager attempts a connection based on the next available profile with the highest priority, until a connection is established or there are no more available profiles.

In accordance with another aspect of the invention, the system and method uses algorithms for searching for a connection profile that fits a search criteria or search string that is specified and other parameters such as availability, priority, and ability to use, for example, whether the device is disabled or enabled.

In accordance with yet another aspect of the invention, the system and method uses a format for connection profile representation that facilitates easy manipulation at the application level. By this format, connection profiles may be easily exchanged externally (between remote devices). Also, the connection manager facilitates remote (between remote devices) configuration and administering of connection profiles. By way of one example, a mobile device may be remotely configured via a wireless communication, for example, by using a short messaging system (SMS) or while performing a synchronization (e.g. HotSync) operation that is commonly performed between a device such a personal digital assistant (e.g. a Palm device) and a desktop computer.

In accordance with yet another aspect of the invention, the system and method of the present invention contemplates the structures that manage the connection manager and all the various kinds of connections. The connection manager may simultaneously connect to different networks (including dedicated connections) depending on the various application running or depending on the demands of a particular application.

The system and method in accordance with the present invention addresses the needs in the prior art and offers improved methods for automatically or manually establishing connections between a mobile device and one or more available networks. The present invention comprises a system and method with connection manager features that accomplish connections between a remote mobile device and available and appropriate networks.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are described in detail below. While specific implementations involving electronic mobile devices (e.g., portable computers) are described, it should be understood that the description here is merely illustrative and not intended to limit the scope of the various aspects of the invention. A person skilled in the relevant art will recognize that other components and configurations may be easily used or substituted than those that are described here without parting from the spirit and scope of the invention.

Figure 1:
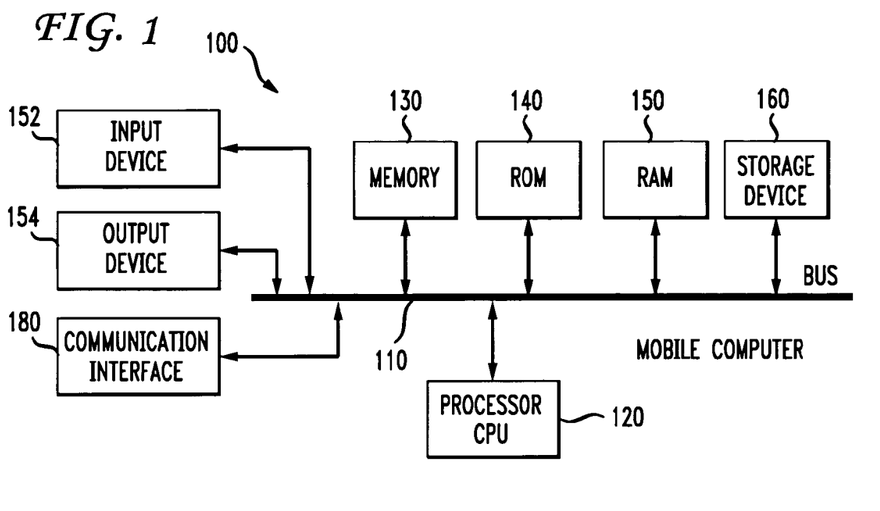
FIG. 1 illustrates the basic components of a computing device (e.g. a laptop or PDA device) to present the environment in which the various aspects of the present invention are practiced.

FIG. 1 (FIG. 1) and its related discussion are intended to provide a brief, general description of a suitable computing environment in which the various aspects of the preferred embodiments of the present invention may be implemented. The systems and processes of the present invention described here are largely applicable to establishing communication between electronic devices (portable computer systems such as laptops, cell phones, pagers etc.) and communication networks. One example of a portable-type computer system that is handheld is called a personal digital assistant (PDA such as a Palm device). Although applicable across a wide variety of other platforms and devices, an embodiment of the present invention is described here by way of example with respect to an exemplary portable or mobile computer system, e.g. a PDA.

Also, the various aspects of the invention that are described here, involve, at least in part, computer-executable instructions, such as program modules, being executed by a personal computer (laptop) or handheld computing device (PDA). Generally, program modules may include routine programs, objects, components, data structures, etc., that perform particular tasks or implement particular abstract data types or functions. Those skilled in the art will appreciate that the various aspects or features of the invention may be practiced with computer system configurations that are not hand-held or mobile devices, but are otherwise incorporated in multi-processor-based systems, microprocessor-based or programmable consumer electronics, network PCs, minicomputers, mainframe computers and the like. The various aspects of the invention may also be practiced in distributed computing environments where tasks are variously performed by remote processing devices that are linked through a communications network. In a distributed computing environment, program modules may be located in both local and remote memory storage devices.

With continued reference to FIG. 1, an exemplary portable or mobile computer system (such as a PDA) is generally illustrated for implementing the various aspects of the invention. The portable or mobile computer system includes a general purpose computing device 100, including a central processing unit (CPU) 120. A system memory 130 and various other system components are coupled by a system bus 110 to the CPU 120. The system bus 110 may be any of several types of bus structures including a memory bus or memory controller, a peripheral bus, or a local bus using any of a variety of bus architectures. The system memory 130 includes read only memory (ROM) 140 (typically comprising flash memory as in a PDA) to store operating system and application code, and random access memory (RAM) 150 to store temporary data for applications.

The computing device 100 also includes a basic input device 152, such as a keyboard or a touch screen (for use with a stylus in the event of a Palm PDA device) that are used to receive data from a user. The computing device 100 further includes a basic output device 154, such as an LCD, to display user interfaces (UI) and other information to the user. In the event that the computing device 100 is a laptop, a storage device 160 such as a hard drive would also be included.

Lastly, the computing device 100 includes a communication interface 180 to communicate with a communication network. Examples of a communication interface 180 include wireless communications hardware (e.g., GPRS (General Packet Radio Service), WiFi, etc.) and direct communications hardware (e.g., dial-up modem and direct LAN connection).

In the example where the computer system 100 is a specifically a PDA device, a communication link is coupled to a cradle or cable dock (not shown) associated with the PDA device for receiving and initiating communication with computer system 100 over a communication line. The cradle provides an electrical and mechanical communication interface or link between the computer system 100 for two-way communications. In one exemplary embodiment, the communication link including the cradle and the line may be a serial communication link or a USB link. The computer system 100 may also contain a wireless infrared communication mechanism for sending and receiving information to or from other devices with which communication is desired.

In one embodiment of the present invention, the communication link may be a serial communication port, but could also alternatively, be any of a number of well-known communication standards and protocols, e.g., parallel, SCSI, Firewire (IEEE 1394), Ethernet, etc. The computer system 100 may also contain one or more other wireless communication mechanisms, e.g., cellular phone, Bluetooth and/or wireless LAN (e.g., IEEE 802.11), for instance, all of which may be used to establish the communication link between the portable computer system 100 and the host computer or with the Internet directly.

The operating system and application code stored in the ROM 140 defines an Input/Output system based on a STREAMS framework for establishing communication. As is well-known to those skilled in the art, a STREAMS framework is an established framework for building modular communication protocols. Alternatively, other network architecture known to those skilled in the art may be used instead of a STREAMS framework. In accordance with the embodiment disclosed here, when an application that is running on the mobile device or the operating system desires to initiate a connection, STREAMS drivers and modules known to those skilled in the art are opened and linked together. For example, communication may be initiated by opening a serial port, which is opened by opening a STREAMS driver. A connection to the Internet is established by opening and linking several drivers or modules, depending on the technologies that are used to access the Internet. The STREAMS framework and the IOS (Input/Output System) do not define any service or library that assists the applications and the system to build STREAMS stacks. In a preferred embodiment, the applications and system do not directly interact with STREAMS drivers and modules.

Moreover, in a preferred embodiment of the present invention, useful connection information (for example: serial port baud rates, PPP passwords, dial-up phone number, etc) is stored. To establish connections effectively, this information is stored such that it may be readily accessed. This information is also stored such that it may be easily edited by the user.

Figure 2:
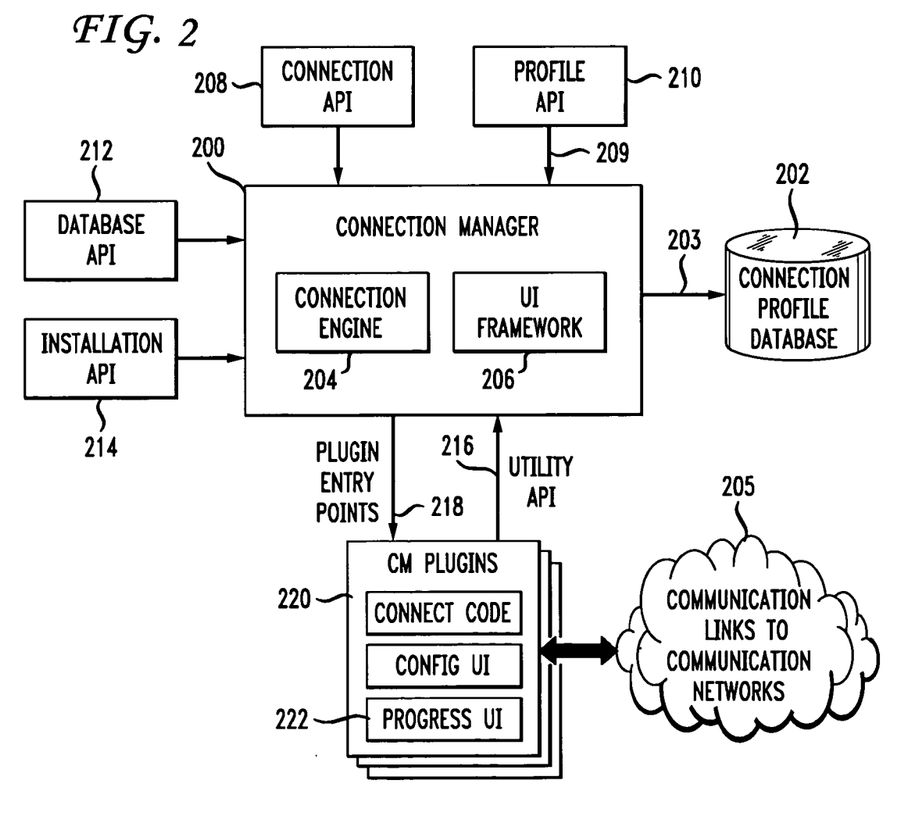
FIG. 2 illustrates the architecture of a connection manager feature in accordance with the preferred embodiment of the present invention as noted in the computing device.

Referring now to FIG. 2, the communication interface is controlled by a connection manager 200. The connection manager 200 is a component used to create, configure and establish any type of connection on the handheld or other computing device 100 whether it is considered a client or server or combination of both. The connection manager 200 comprises various configuration panels and is responsible for implementing connections between the device 100 and a communication network (reference numeral 205 generally indicates communication links to communication networks). In accordance with one preferred embodiment of the invention, the connection manager 200 effectively manages all types of connections that are possible in today's communication environment.

To establish a physical connection, the connection manager 200 defines a data structure or a communication stack called "a connection profile." A connection profile is an object that orders plug-ins and configuration settings for each plug-in that is referenced. A plug-in is a piece of code that is responsible for configuring and connecting one or more communications components that implement one or more protocols that dictate a physical connection. A plug-in may also contain instructions to configure user interface components to implement a physical connection. The connection manager 200 creates connection profiles, either manually via a "Wizard" interface or automatically via APIs (Application Program Interface) or downloading from external locations. It can modify connection profiles, either manually via a UI interface or automatically via APIs.

Connection profiles are typically stored in a connection profile database 202, but also may be private to a particular system application. The connection manager 200 communicates with the connection profile database 202 as indicated by communication line 203 and manages the connection profiles database 202. It allows the user, the overriding applications or the system to perform any of a myriad of tasks, for example, to edit, to create, to delete, to change, to connect, or to disconnect any of the connection profiles that are stored in the connection profiles database.

Figure 4:
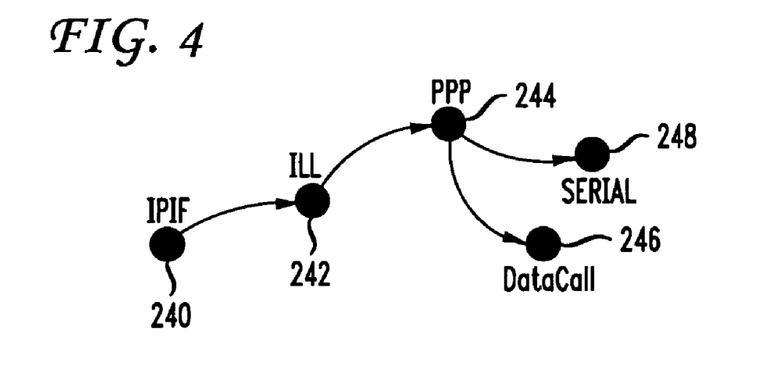
FIG. 4 is one example of a graph of a common connection type stored in the connection manager database associated with the connection manager.
Figure 5:
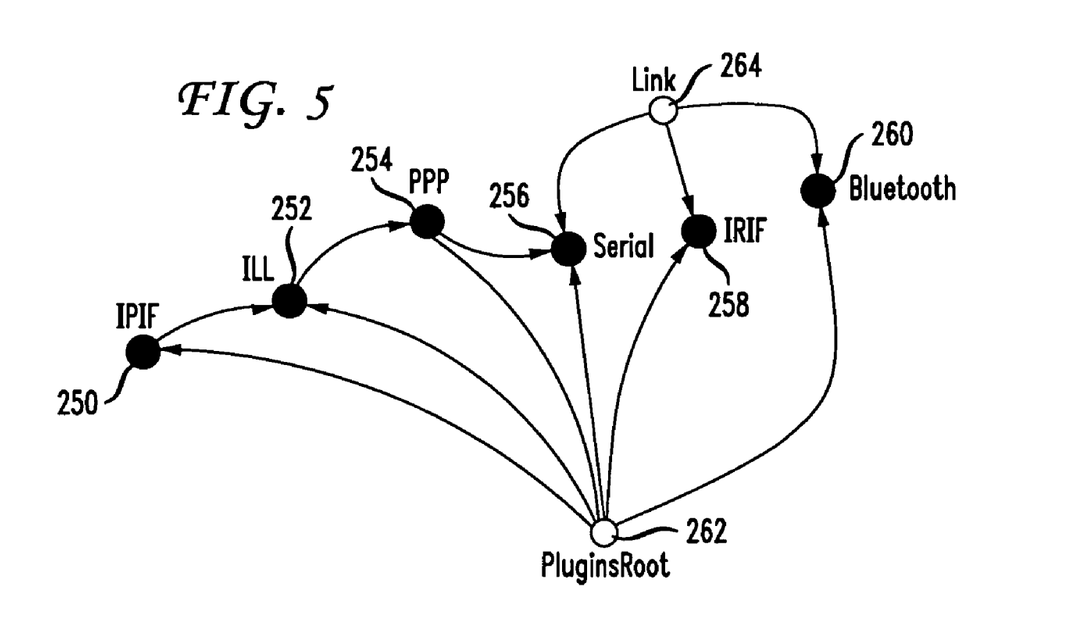
FIG. 5 illustrates the plug-ins (an active object or code used to configure and control a communication component) and interfaces (a way to abstract nodes of the graph that are equivalent from a certain point of view) in a communication manager graph ("CMG") in accordance with one preferred embodiment of the present invention.

It should be understood that a connection profile may be created to represent any kind of physical connection known to those skilled in the art. A connection profile (object) is created by defining a sequence of plug-in and interface nodes from a connection manager graph (examples of which are shown in FIGS. 4 and 5) that forms a complete path from a high level component to a lower-level component that actually establish a physical connection. By way of one example, a phone dial-up internet connection profile consists of several items, such as a dial-up item that defines dial-up parameters (e.g. phone number), a PPP element that defines PPP parameters (e.g. login, password), a phone item that defines phone parameters (e.g. phone driver), etc.

It should be recognized that the STREAMS framework and Input Output System (IOS) are plug-able by nature, that is, a new technology may be easily added by providing new STREAMS modules and drivers. Each technology that is added provides a connection manager plug-in that defines code to handle the technology, for example, how to connect, how to edit, user parameters, and so on. Connection profile items are mere references to connection manager plug-ins (a PPP item designates the PPP plug-in).

The connection manager 200 provides a standard connection API (Application Program Interface) indicated by system block 208 to activate connections and to manipulate connection profiles. To activate connections, the connection manager 200 uses information stored in the connection profiles database 202. A particular connection profile defines the plug-ins, that is, the communication protocols that are involved in establishing a connection. To activate a connection, the connection manager 200 solicits plug-ins, along line 212 (see plug-in entry points) according to a particular connection profile that is determined. The algorithms used by the connection manager 200 to search for connection profiles are described in greater detail below. Likewise, the interaction between the system or the user with the connection manager database 202 is also described in greater detail later in this application.

By way of one example, a connection is illustrated by a standard IP connection over a PPP link. A CncProfileFindConnect function is presented in terms of functionality. To enable a PDA device such as a Palm to communicate with a remote TCP server service, the following operations are necessary. First, an Internet connection (if not already open), from the communication interface 180 of mobile device 100 is established. Then, the serial port (Serial Plug-in) is opened. Subsequently, a number (Phone or Modem Plug-in) is dialed, PPP is run, and then network access information is exchanged (PPP plug-in). Finally, the Internet Protocol is run over PPP. Alternatively, a standard socket call may be used to create a TCP connection with a remote host on a well-known TCP service.

The connection manager 200 provides a unified approach to establishing physical connections. An example set forth below illustrates how the connection manager 200 in conjunction with the BSD socket API create a physical normal connection (IP, Serial, RfCom, IrComm):

```
// initialize a standard BSD Socket sockaddr structure (IP Address,
// TCP service, etc). mySocketDescriptor
...
// Search the database for an Internet profile and connect it
CncProfileFindConnect("IP/*");
// Create a TCP socket with the BSD Socket API
mySocket = socket(PF_INET, SOCK_STREAM,
getprotobyname("TCP"));
bind(mySocket, mySocketDescriptor, ...)
```

The connection manager 200 architecture may also be used to store "service level connections." Consider an example of a service level plug-in. A TCP plug-in is in charge of opening a TCP socket. The plug-in needs two parameters: the IP address (or name of the server) and the name or identification of the requested TCP service. An application using a TCP profile would appear as follows:

mySocket=CncProfileFindConnect ("TCP:myhost.mydomain.com,http/*")

The connection manager 200 may also be used to manage application level profiles such as HOTSYNC, SMTP or OBEX connections. The connection manager 200 communicates along line 209 with the API profile interface shown by system block 210. Some examples of application level profiles are illustrated below:

```
mySocket = CncProfileFindConnect("HOTSYNC/*");
mySocket = CncProfileFindConnect ("SMTP/*");
mySocket = CncProfileFindConnect ("OBEX/*");
```

In one scenario, a socket call may be placed before any Internet connection is available (and so without calling CncConnect("IP/*")). In this scenario, instead of sending an error message (e.g. "Network unreachable") for display at the output device 154 (see FIG. 1), the socket algorithm may choose to try to open an "IP/*" connection profile before building the socket.

The CncProfileConnect function returns a file descriptor. This file descriptor is provided by the IOS. Applications and other shared libraries will normally use this file descriptor to read/write data, configure the connection or close it. IOS API will be used for this purpose.

Figure 3:
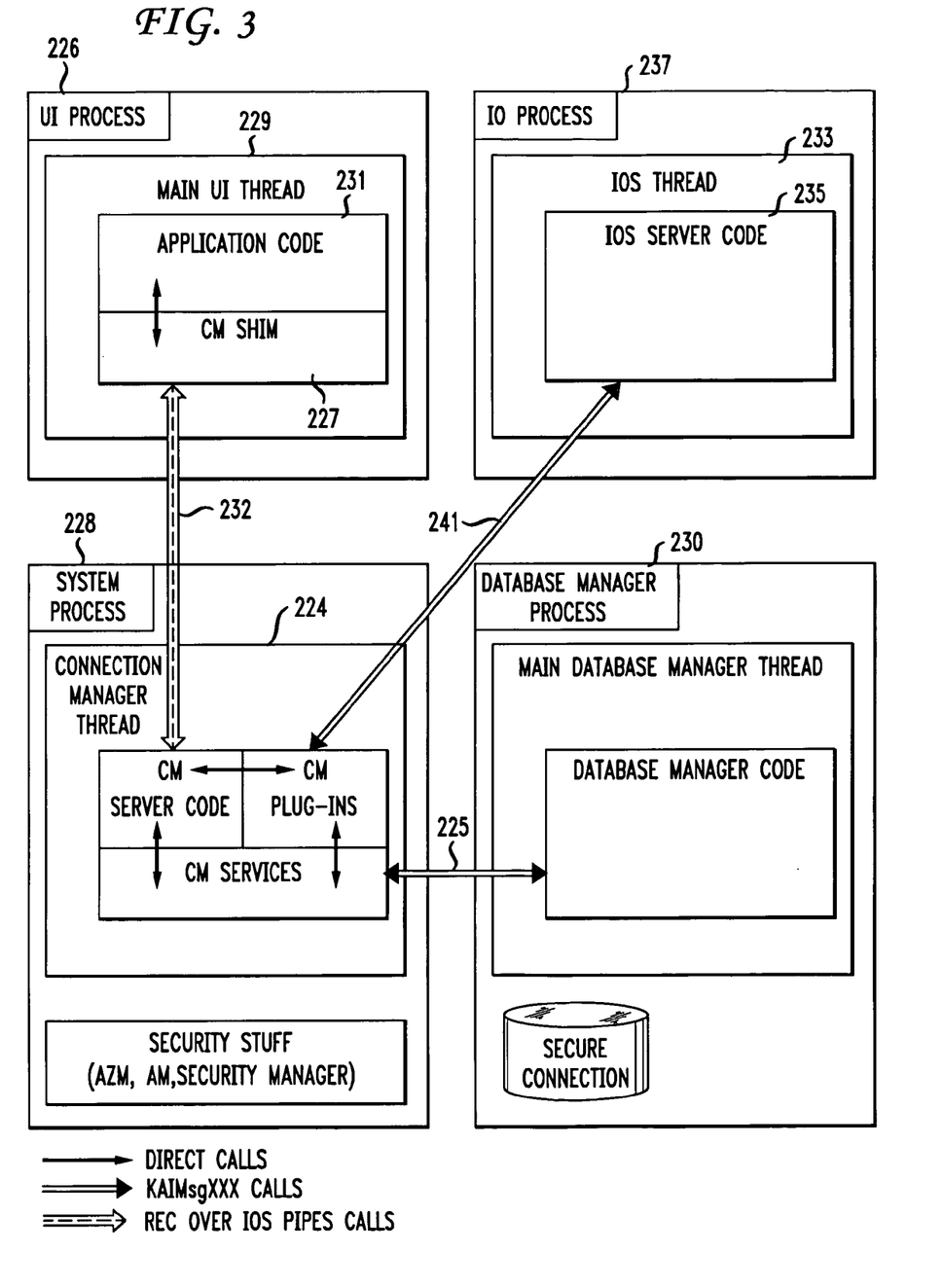
FIG. 3 is the relationship between the user interface, input/output, system process, and database manager processes that interact to facilitate the connection capabilities of the connection manager features in accordance with the preferred embodiment of the present invention.

Referring now to FIG. 3 and with continuing reference to FIG. 2, it should be noted that the connection manager progress user interface 220 (see FIG. 2) takes place in the connection manager thread 224 (see FIG. 3). FIG. 3 also represents a main UI thread 229 (illustrating application code 231 and connection manager SHIM 227) and IOS thread 233 (showing IOS server code 235). The IO process 237 communicate with the system process 228 along pipe 241.

Another type of connection referred to as a persistent connection exists and is also described here. A persistent connection is an active connection that may exist independently of the process that activates it. The system resources that define a persistent connection have to be managed by a process other than one that activates the persistent connection.

If all system resources needed by a connection are only "owned" by the UI process 226 (see FIG. 3), the connection will be lost when switching from one application to another. An example that illustrates this scenario is when a user uses a "connect" button on a panel (a part of the input device 152 in FIG. 1) on the physical mobile device 100 to activate an Internet connection and then switches to a web clipping or mail application. The user would not want the connection to shut down while switching applications. Connection shut downs generally should only occur responsive to a user request or perhaps automatically due to inactivity for a period of time (e.g. after a timeout period passes).

The connection manager 200 facilitates storage of state information about persistent connections. The connection manager 200 provides an API to test the state of a connection. The connection manager 200 is notified by communication components about the state of connections. For example, IP and PPP have threads in the system process that communicates with the connection manager 200 about connections and disconnections.

Using a thread (software task) in the system process 228 to manage sensitive information such as connection passwords ensures real security. All connection manager clients are notified of asynchronous operations. Each connection manager client is connected to the connection manager thread 224 via an IOS pipe. A client request is carried on the pipe. The connection server handles the request and replies to the client via the same pipe.

Referring specifically to FIG. 3, the operation of the connection manager 200 is described with an assumption that the caller is the main thread of the user interface (UI) process 226. Background processes, other UI process threads or other system threads may use the connection manager API shown generally by system block 208.

Within the connection manager 200, a connection manager library (the SHIM, code to call the connection manager, indicated by reference numeral 227 in FIG. 3) under control of a database manager process 230 initiates communication with the connection manager thread 224 via a pipe 225. In result, the connection manager thread 224 creates a two-way communication channel 232 between itself and the calling process (from the UI process 226). The connection manager thread 224 implements a simple "server," polling the named pipe file descriptor as well as the "receive channel" file descriptor of all communication channels. The underplaying message protocol used by the connection manager thread 224 and the connection manager library is not defined at this point.

To describe the operation of the connection manager 200 in further detail, the core of the connection manager 200 represented by a system block captioned as UI FRAMEWORK and indicated by reference numeral 206 is a generic frame that carries no knowledge of a particular connection layer or a particular configuration parameter. The frame is responsible for using connection manager profiles and connection manager plug-ins to activate the configuration UI components of a plug-in. The UI framework 206 handles transitions between forms and the creation, edits, and deletion of connection manager profiles from the UI.

The portion of the connection manager 200 that uses connection profiles and connection plug-ins to create the actual connection is represented by a system block captioned CONNECTION ENGINE and indicated by reference numeral 204.

The connection manager 200 provides a complete set of API, which are divided into several categories. For a standard application, connection API 208 may be the primary application interface to initiate and/or terminate a connection. The profile API 210 is the application interface to perform operations to create, edit, delete, or complete connection profiles. For a specialized application (such as the operation of a panel on the input device 152, a database API represented by a system block 212 and indicated by reference numeral 212 is the interface to operations to create, edit, delete, and record connections in the connection profile database 202.

Yet another example of an API is represented by a system block 214 indicated by reference numeral 214 and captioned INSTALLATION API for registering the plug-ins. The installation API may be called by plug-ins, which are described below. For plug-ins, a Utility API (Tool Box) indicated by reference numeral 216 are provided by the connection manager 200 and used by any particular plug-in. A plug-in provides several entry points (see link 218) called by the communication manager for establishing connection, displaying UI, etc. As indicated before, a connection manager plug-in (see block captioned CM PLUGINS indicated by reference numeral 220) is a piece of code and the resources responsible for configuration and establishment of a layer within a communication stack. This layer may contain one or more communication components, and implement one or more protocols. A plug-in also contains the UI to configure the particular layer. Various examples of plug-in are Bluetooth, IP, PPP, USB, etc. Hence, plug-ins define some standard entry points called back by the connection manager engine 204. Multiple plug-ins (see 220) may be packaged in a module carrying the same code. A module defines at least one launch code for example, sysCnc. Another example is LaunchCmdGetPlugins, whereby the plug-in module will return the list and count of plug-ins defined in the module. A module may also define the sysCncPluginLaunchCmdRegister launch code. The connection manager 200 calls it once the plug-ins defined in the module are added to the connection manager database 202 is where interfaces, edges, profiles, templates, etc. are defined. To avoid problems that may arise with depending on modules if particular module depends on plug-ins defined in another module, modules may recite "call back" functions.

In an installation step (hard reset time or hot installation), the connection manager plug-in modules are registered (for example on a reset or HotSync notification) using the CncRegisterPluginModule( ) API. In a configuration step, the connection manager 200 loads the plug-ins module and calls the main entry point of the module with sysCncPluginLaunchCmdGetPlugins. The plug-in module returns the plug-ins array and plug-ins count. The connection manager 200 adds the plug-ins to its database 202. Then, the connection manager 200 calls the main entry point of the module with sysCncPluginLaunchCmdRegister. The plug-in module adds edges, interfaces, profiles, and templates to the database 202 or sets the Done field to false to be called back later.

Each particular application, to determine which profile to connect, involves a process. For example, if a particular application wants to establish a connection with the Internet, the appropriate connection profile is determined by the system or the user rather than the application. In this case the application just knows that the profile to connect begins with a specific item referencing the technology that enables TCP/IP connections.

In accordance with a preferred aspect of the present invention, the connection manager 200 enables searching for profiles beginning with one or more well-known technologies. The connection manager 200 searches for connection profiles that fit a search string and several other parameters such as priority, usability, availability of profiles etc. The automatic connection algorithm uses search functions to determine the right profile to connect. A profile search string has the same format as a profile string but is terminated by the two chars: '/*'.

By way of illustration, note that all Internet profiles begin with a "NetOut" item. An application can search or connect the right profile by searching or connecting the "NetOut/*" search string. The connect algorithm will search all profiles beginning with the "NetOut" item and, given other rules (priority, availability, usability) will try the right profile.

Referring now to FIG. 4, the connection manager database 202 in accordance with one exemplary embodiment may be organized as a graph of all common connection types (the "CMG"). FIG. 4 represents s a simplified example of such a graph. In this graph, nodes are communication components and an edge (a, b) of components simply means that the component a can be directly used on top of the component b. Various plug-ins are illustrated in FIG. 4. An IP Interface plug-in ("IPIF" in FIG. 4) is indicated by reference numeral 240. An IP Link Layer Plug-in ("ILL" in FIG. 4) is indicated by reference numeral 242. A:Point-To-Point Protocol Plug-in ("PPP") is indicated by reference numeral 244. An AT Dialer plug-in ("DataCall") is indicated by reference numeral 246. A Serial plug-in ("SERIAL") is indicated by reference numeral 248.

A CMG such as that illustrated in FIG. 4 may be built as follows. At initialization time, the connection manager 200 and its plug-ins 220 (FIG. 2) build a default CMG consisting of all common connection paths. When adding a new communication component, the associated connection manager plug-in is responsible of the evolution of the CMG.

In some circumstances, an application may want to add or delete interfaces or edges to the CMG. For example, HotSync may want to add a HotSync interface to group all HotSync capable connections. An application is not allowed to create or delete plug-ins. The connection manager 200 provides APIs to manipulate this graph. Authorized code, including plug-ins and system code, are able to create or delete plug-in and interface nodes as well as common paths. General user applications are not be able to do so.

A connection profile is a node sequence of the CMG where each node is labeled by a property list as indicated above. The node sequence defines plug-ins and interfaces involved in the connection. Properties are configuration parameters for plug-ins.

P=({a1 a2 ... an}, {p1 p2 ... pn}), where a1 a2 ... an are nodes in the CMG and p1 p2 ... pn are properties respectively labeling a1 a2 ... an profile nodes.

Connection profiles will be normally stored in the connection manager database (see FIG. 3). An application has the ability to manipulate private connection profiles that are invisible to other applications. A connection profile can reference other connection profiles. In such case and when needed (for example on connect), the profile is "linearized", i.e. profile references are expanded to the plug-ins/interfaces sequence they represent When invoked with a profile, plug-ins functions will be able to access property list of other nodes in the same profile. For example, if the rs232 interface node is associated with a property list defining general rs232 parameters, the serial plug-in will be able to access these parameters.

The node sequence of a profile may or may not be a valid path in the CMG. CMG just defines common paths. Applications will be able to define/use non-common paths, given that related communication components are designed to interact together. For example, a PPP client could be connected to a TCP socket by a PPP debug application, even if the CMG does not define such a path.

When making a physical connection, the application program generally interacts only with the highest level component, which defines the connection type. In the example of a TCP/IP, the program application does not need to know about lower-level connections.

Referring now to FIG. 5, plug-ins and interfaces within a connection manager 200 are illustrated. A connection manager interface represents a node of the connection manager graph. An interface is a way to abstract nodes of the graph that is equivalent from a certain point of view. Interfaces are not directly related to one communication component and don't come with code nor UI. In FIG. 5, the IP Interface plug-in ("IPIF") is indicated by reference numeral 250. The IP Link Layer plug-in ("ILL") is indicated by reference numeral 252. The Point-To-Point Protocol plug-in ("PPP") is indicated by reference numeral 254. The Serial plug-in ("Serial") is indicated by reference numeral 256. The Infrared Interface plug-in ("IRIF") is indicated by reference numeral 258. The Bluetooth plug-in ("Bluetooth") is indicated by reference numeral 260. The PluginsRoot interface ("PluginsRoot," there is an edge from the PluginsRoot interface to each plug-in) is indicated by reference numeral 262. The Link interface (points to Serial, IRIF (Infrared) and Bluetooth)) is indicated by reference numeral 264.

Profiles can be created by the user via the connection application, by programming or by software installation. The connection manager 200 also allows modification and management of existing profiles via the connection application or by programming. A program application can also create and manipulate private connection profiles that are visible only to the application.

When an application or the system wants to connect a connection profile, the connection manager 200 calls back each plug-in associated with each item of the profile. The application or the system must make a function call to the connection manager 200 and receives, in return, a file descriptor that represents the connection.

Another aspect of the connection manager 200 deals with how to represent connection profile. In other words, how to easily manipulate connection profiles (which are list where each items can define parameters) from any programming language and how to enable the exchange of connection profiles between over a network (for example to implement configuration over the air).

In a preferred embodiment of the present invention, a string format is defined that easily represents any kind of connection profile. High-level languages have easy-to-use strings manipulation routines. The connection manager 200 of the present invention defines a format that eliminates classic exchange problems like endianess. As is well known to those skilled in the art, endianess deals with the pattern by which computers internally store numbers (byte ordering in native types, such as integers). Internally, the connection manager 200 handles binary representations of connection profiles. A function will decode a string representation of a connection profile to an internal binary representation, and another function will encode an internal binary representation of a profile in a string representation. A string is a list of plug-in names, with some values to indicate their configuration parameters.

A connection profile string is an external textual representation of a connection profile. It's a way to easily represent connection profiles. For example, connection wizard applications will use connection profile strings to create and store new connection profiles in the connection manager database.

The general format of connection profile strings is:

"a1:p1/a2:p2/ ... /an:pn", where a1 a2 ... an are nodes in the CMG and p1 p2 ... pn are properties lists respectively labeling a1 a2 ... an profile nodes. Property lists are parameter values separated by commas. Binary parameters are encoded using a textual hexadecimal representation enclosed into braces. String parameters are enclosed into quotes. Special characters as well as the equal and quote signs must be represented with a quoted-printable notation (=XY). Integers begins with a digit. Hexadecimal numbers begins with 0x.

The following are examples:

```
sprintf(
profile,
"SerialMgr:name='PortCOM1',crea=0x31323334/Serial:Baud=%d,
    FCtl=0x%X,
Bits=0x%X",
    B9600,
    CRTSCTS,
    CS8
);
    profileId = CncProfileDecode("SerialMgrPort1Profile", profile);
```

A connection profile Id is an integer value (uint32_t) that represents one, and only one, stored connection profile. It's the favorite way to reference an existing connection profile. The Connection Manager API does a great use of connection profile Ids. Plug-ins and interfaces have also Id.

By way of one example, details of a string format that is used to represent a connection is set forth below:

Details of a String Format

| | |
|---|---|
| ::= | Defines an a non-terminal symbol |
| <...> | Non-terminal symbol |
| 'x' | A character |
| { ... } | Element enclosed in brackets can be repeat 0 to n times. |
| [ ... ] | Element enclosed in brackets ca be repeat 0 or 1 time. |
| \| | Alternative (just one of the two elements) |
| nothing | Just nothing (just a comment) |

```
<connection profile string> ::= <element> { '/' <element> }
<element> ::= <element_name> [ ':' <param_list> ]
<param_list> ::= nothing | <param> { ',' <param> }
<param> ::= <param_name> '=' <param_value>
<param_value> ::= <param_string> | <param_binary> |
    <param_integer>
```

<param_name> is 1 to 4 chars, some chars are not allowed: ':', '=', '/' or space OR an hexadecimal view of the parameter name: '[' 4 bytes in ascii hexadecimal representation. Examples: [0FABE3D1], User, Pass.

<element_name> is a sequence of chars. Some chars are not allowed: ':', '=', '/' or space. Examples: PPP, Phone, Serial.

<param_string> is a quoted-printable string beginning and ending with simple quote. Example: 'This a=0A=0Dstring.' param_binary> is a sequence of bytes. Each byte is represented by two hexadecimal digits beginning with '[' and ending with ']'. Example: [01779AF8280F].

<param_integer> is an unsigned integer on 32 bits. It can be a decimal or hexadecimal representation. Example: 18972, 0xFEA4.

By way of one example, it is shown below how to create, in C language, a new connection profile from a connection profile string:

```
profileId = CncProfileDecode(
    "RAS via Serial",
    "NetOut/IPIF/ILL"
    "/PPP:User='ppptestras',Pass='ppptestras',ConT=30000"
    "/Script:LogS=["
    "7320434C49454E5400"    // Send 'CLIENT'
    "64203100"              // Delay 1
    "7320434C49454E5400"    // Send 'CLIENT'
    "772056455200"          // Wait 'VER'
    "00]"                   // End
    "/RS 232 at 115000bps" );
```

The connection manager 200 advantageously addresses past issues with network configuration, such as scalability, maintainability, flexibility. To illustrate the advantages, it should be noted that in the past, the burden is on the calling code to understand communication settings. For example, a network module has conditional code to call a particular task manager to dial a modem or to dial a cellular phone. If a new transport is added, for example Bluetooth, the network module has to be updated to include code to communicate with the Bluetooth API and understand Bluetooth parameters.

The connection manager 200 in accordance with a preferred embodiment, has the ability to "exchange" connection profiles and receive a connection profile either by HotSync, beaming or SMS operations. This advantageously allows for remote administration. Alternatively, beaming or sending configurations may be done. Regardless of how the content (objects) is received, it is automatically registered and usable by the connection manager 200. The connection manager 200 is also automatically notified of incoming content (objects). The object can be sent or received with all transports provided by the libraries (SMS, email, Ir etc). For security reasons, these objects may be signed and encrypted.

Moreover, the connection manager 200 provides a generic "Connect" API. Applications only have knowledge of the upper protocol in the stack, the one they are using, and are shielded from other connection details as far as possible. The connection manager 200 provides "incomplete connection profile" ability. Application can connect using a connection profile which is not entirely specified, and which is completed at run-time either automatically or with user intervention. There are two types of incomplete profiles: The path is not fully specified. For instance, an application may ask for a TCP/IP connection without specifying the kind of serial connection. In the event that some settings are missing, the application connects with an "AOL" profile where PPP login and passwords are missing. The connection manager 200 provides a non-UI mode for background task or for auto-reconnect mode.

For communications components in the ROM 140 (see FIG. 1), the connection profiles are predefined in the ROM. A setup plug-in (see the "Setup CDB"), is launched by the Setup application after a hard-reset is provided, to create the profiles in the connection database in the RAM 150. Moreover, if some profiles are incomplete, the plug-in adds steps in the Setup wizard to request them.

For other communication components, the connection profiles are built by application, either some installation code or a dedicated application such as a phone application. An application can decide to keep a connection profile private by not storing it into the database and by providing an explicit connection string at connect time. A end-user may also create or complete connection profiles manually at any time.

Connection profiles are never created by the connection manager 200. However, when connection manager plug-ins register with the connection manager 200, they will sometimes create default profiles.

The connection manager 200 does not interact directly with the I/O subsystem. Instead, the connection manager plug-ins 220 (FIG. 2) interact with the I/O subsystem to establish a connection. The connection manager plug-ins 220 are responsible for opening and configuring some communication components, through IOS calls, and for processing notification of some exceptional events. At some point during the connection establishment, a plug-in asks its child to connect (it calls CncConfigureChild), get a file descriptor, push some modules on it, and return a new file descriptor.

Connection profiles stored in the connection manager database 202 (FIG. 2) have priorities assigned. Connection profile priorities are assigned either by programming or by the user. A profile is normally inserted in a list of equivalent profiles (for example all Internet profiles are in the same list). The priority is used to find the position of the profile in the list when the profile is first inserted. The order of the profiles in the list can be changed by programming (generally following a user action). Search algorithms always return profiles first regarding the list order. For example, the default Internet connection will be the first profile in the Internet list.

Connection profiles have availability and state information. The availability says if the profile can be connected at this time (for example, if one puts a Palm device on its cradle a "Palm On The Cradle Internet Connection" becomes available). The state says if a profile is connected or not.

Templates are special profiles used when creating a new profile. When creating a new profile, the user may have to choose a template that will be copied to a real profile. Macro profiles are profiles with the name beginning with '{' (kCnc-MacroSpecialChar). Macro profiles are not attached to any plug-in or interface on creation. They are used as reference in profile or templates. The two special macros {REPLACE} and {USING} are used when the user creates new profiles.

Link objects are used to associate several different names to a same profile. They act like symbolic links or shortcuts: they reference another object and when they are searched for, the real object they point to is returned. This is useful when creating default profiles with internationalized names, but also when such profiles can be referenced by others with a well known, internationalization independent, name. For example a link named "RS232 at 115200 bps" can point to the international-related profile.

To create profiles, applications and the system will be able to create and add connection profiles to the connection manager database 202. The connection manager provides an API to search the connection manager database 202 for profiles that match a search string. The search string is comparable to a profile string, may or may not define node properties, and can be terminated by a joker. The search algorithm will use the CMG and the stored profiles to complete the search string in a valid profile string. For example, giving the "IP/*" search string, the algorithm will search for all Internet profiles. The search API will consist of at least two functions: CncProfileFindFirst, CncProfileFindNext. The first function creates a temporary search profile in the connection manager database 202 and performs a first search. The second function searches for the next profile. An application can call this function several times to retrieve all profiles corresponding to the search string. Finally, the CncProfileClose function is called to release the temporary search profile. Profiles are returned in an order related to profile order.

To be usable, profiles must be configured i.e., each plug-in, in the profile must have at least the parameters needed for a connection. There are three ways to assign parameters to a node: store parameters in the property list of the plug-in. This can be done by programming, for example at the creation of the profile. The second way is accomplished by the configuration callback of a plug-in: the code defines default parameters and/or is able to find parameter values in property list of other profile nodes. The last way is to ask the user to define missing parameters. Once again, it's the responsibility of the plug-in to define a UI that allows the user to enter the configuring parameters. Once a connection profile is complete and configured, a connection manager is able to try a connection on it.

The ROM 140 (see FIG. 1) contains several communications components, such as TCP/IP, PPP, IrComm and IrDA along with their plug-ins and predefined connection profiles. On first run, or after a hard reset, the connection manager 200 creates the profile database in the RAM 150 (see FIG. 1). Each plug-in in ROM 140 has the responsibility to register with the connection manager 200 and to add default profiles. For instance, a profile named "Infrared connection" is created in the plug-in registry, providing a serial interface and requiring no interface. Now when the Nokia phone driver package comes in, it will create the Telephony profile "Nokia on Infrared connection" and the TCP/IP profile "Internet with Nokia via Infrared". It can even check what hardware is available on the device, and creates profiles accordingly (for instance, create Bluetooth profiles only if Bluetooth hardware exists).

The following API can be used from install code, configuration applications and third parties applications. Some restrictions can be applied if the application code is not trusted by the system. For example, a non-trusted application will not be able to get sensitive parameters such as VPN or PPP passwords.

One implementation involving the inventive aspects described below relates to the operating system of the Palm PDA device. In that implementation the connection manager 200 includes the CncMgr.h file and link against the CncClientLib.a stub library. The table set forth below indicates the availability constants relating this specific implementation.

| Availability constants (Set/Get Info) |
|---|
| By default, all profiles have an availability of kCncAvailable. A system driver or manager can change these values to mark a profile as unavailable. A value between kCncPercentBaseAvailability and kCncPercentBaseAvailability + 100 represents a percentage of availability between 0 and 100 (It is the case for a phone signal strength for example). |

| | | |
|---|---|---|
| kCncUnknownAvailability | 0 | The Connection manager will try to dynamically determine the availability when asked by sending the kCncControlAvailability to each plug-in of the profile |
| kCncAvailable | 1 | The profile is available for connecting |
| KCncPercentBaseAvailability to KcncPercentBaseAvailability + 100 | 100 | The profile is available with a defined percentage (phone signal strength for example) |
| kCncNotAvailable | 255 | The profile is not available for connecting (for example the profile "IP in the craddle" should not be available if the device is not in the craddle) |

| Field | Provided by | Description |
|---|---|---|
| nameP | All plug-ins | A unique 32 char max name for the plug-in. For example: 'PPP' or 'Serial' |
| Version | All plug-ins | A version number. During registration, if a plug-in with the same name already exists, the Connection Manager chooses the right plug-in by selecting the one that has the greatest version. |
| formId | Plug-ins that have configuration UI. | The resource Id of the plug-in configuration form. |
| connectF | Almost all plug-ins | Called back by the Conection Manager when a profile referencing the plug-in is connected. |
| formHandlerF | Plug-ins that have configuration UI. | A form handler installed by the config app when the user configures a profile referencing the plug-in. This form handler is installed when the form resource formId is loaded. |
| formValidateF | Plug-ins that have configuration UI. | The configuration app calls this callback before closing the plug-in configuration form. |
| externalNameId | All plug-ins that user can view. | The ID of a string resource. A user-friendly name. |
| cancelF | Plug-ins that want to be asynchronously notified of a connection cancellation. | The connection manager calls this function if the user or an application wants to cancel a ongoing connection. |
| controlF | Plug-ins that have special requirements. | The connection manger calls this function when an |

-continued

Availability constants (Set/Get Info)
By default, all profiles have an availability of kCncAvailable. A system driver or manager can change these values to mark a profile as unavailable. A value between kCncPercentBaseAvailability and kCncPercentBaseAvailability + 100 represents a percentage of availability between 0 and 100 (It is the case for a phone signal strength for example).

| | | |
|---|---|---|
| woParams | A plug-in can specify up to kCncWOParameterCount (4) write only parameters names | application or the system calls CncObjectControl. Write only parameters cannot be read with the client API CncProfileGetParameters. They are useful for password protection. |
| pluginIndex | SYSTEM USE | N/A |
| moduleP | SYSTEM USE | N/A |

Although the above description may contain specific details, they should not be construed as limiting the claims in any way. Other configurations of the described embodiments of the invention are part of the scope of this invention. For example, the format negotiation may exist on a single compute device and between nodes within that device or the negotiation may occur over a communications network between nodes of the network. Accordingly, the appended claims and their legal equivalents should only define the invention, rather than any specific examples given.

What is claimed is:

1. A method for establishing a connection between a mobile device and one or more available communication networks including one or more dedicated connections as the mobile device changes environments, the method comprising the steps of: assembling one or more plug-ins into a connection profile, wherein the one or more plug-ins include computer executable instructions that configures one or more communication components that implement one or more protocols that dictate a physical connection within a mobile device; storing on the mobile device a plurality of connection profiles in a database, the connection profiles configuring a connection between the mobile device and one or more communication networks that are available in a computing environment surrounding the mobile device, each connection profile having a priority, the priorities of the plurality of connection profiles ranging from high to low; determining an availability of at least one connection profile by querying an availability of the one or more plug-ins associated with the at least one connection profile; determining a usability of at least one connection profile; selecting a connection profile from the plurality of connection profiles having the highest priority and that has been determined to be available and usable based on a current environment of the mobile device; and attempting to establish a connection to a communication network using the selected connection profile.

2. A method according to claim 1, wherein the step of attempting is a first attempt to establish a connection.

3. A method according to claim 2, further comprising the step of:
attempting a second attempt to establish a connection with another communication network accorded a next highest priority connection profile in the event the first attempt fails.

4. A method according to claim 1, wherein the one or more communication networks include a wireless communication network.

5. A method according to claim 4, wherein the wireless communication network uses Bluetooth technology.

6. A method according to claim 4, wherein the wireless communication network uses IrDA (infrared data association) technology.

7. A method according to claim 4, wherein the wireless communication network is an IEEE 802.11 WLAN (wireless local area network).

8. A method according to claim 4, wherein the wireless communication network is a GPRS (general packet radio service) network.

9. A method according to claim 1, wherein the communication network is accessed via a dial-up modem.

10. A method according to claim 9, wherein the dial-up modem provides access to a PPP (point-to-point protocol) network.

11. A method according to claim 1, wherein the step of attempting to establish a connection includes one or more attempts until no communication networks remain.

12. A method according to claim 1, wherein the connection profiles are created by an application program stored in a memory within the mobile device.

13. A method according to claim 1, wherein the connection profiles are downloaded externally.

14. A system for establishing a connection between a mobile device and one or more communication networks including one or more dedicated connections as the mobile device changes environments, the system comprising: one or more plug-ins that are assembled into a connection profile, the one or more plug-ins include computer executable instructions that connect one or more communication components that implement one or more protocols that dictate a physical connection within a mobile device; a connection profile database on the mobile device for storing a plurality of connection profiles, the connection profiles configuring a connection between the mobile device and one or more communication networks that are available in a computing environment surrounding the mobile device, each connection profile having a priority, the priorities of the plurality of connection profiles ranging from high to low; a connection manager for selecting a connection profile from the plurality of connection profiles, the selection based on a determination that one of the plurality of connection profiles is available, usable and has the highest priority; and a communication interface for attempting to establish a connection to a communication network associated with the selected connection profile.

15. A system according to claim 14, wherein the communication interface attempts a first attempt to establish a connection based on a first connection profile that is assigned the highest priority.

16. A system according to claim 15, wherein the communication interface attempts a second attempt to establish a connection with another communication network accorded a lower priority in the event the first attempt fails.

17. A system according to claim 14, wherein the one or more communication networks comprise a wireless communication network.

18. A system according to claim 17, wherein the wireless communication network uses Bluetooth technology.

19. A system according to claim 17, wherein the wireless communication network uses IrDA (infrared data association) technology.

20. A system according to claim 17, wherein the wireless communication network is an IEEE 802.11 WLAN (wireless local area network).

21. A system according to claim 17, wherein the wireless communication network is a GPRS (general packet radio service) network.

22. A system according to claim 14, wherein the communication network is accessed by a dial-up modem.

23. A system according to claim 22, wherein the dial-up modem accesses a PPP (point-to-point protocol) network.

24. A system according to claim 14, wherein the communication interface continues to attempt establishing a connection until no communication networks remain.

25. A system according to claim 14, wherein the connection profiles are created by an application program stored in a memory within the mobile device.

26. A system according to claim 14, wherein the connection profiles are downloaded externally.

* * * * *